United States Patent
Bowling et al.

(10) Patent No.: US 7,201,847 B1
(45) Date of Patent: *Apr. 10, 2007

(54) WASTEWATER TREATMENT METHOD UTILIZING WHITE ROT AND BROWN ROT FUNGI

(76) Inventors: Michael Bowling, 6613 Schooner Bay La., Hixson, TN (US) 37343; Phil Adams, 3075 Foxhall Overlook, Roswell, GA (US) 30075

( * ) Notice: Subject to any disclaimer, the term of this patent is extended or adjusted under 35 U.S.C. 154(b) by 130 days.

This patent is subject to a terminal disclaimer.

(21) Appl. No.: 11/029,538

(22) Filed: Jan. 5, 2005
(Under 37 CFR 1.47)

Related U.S. Application Data

(63) Continuation-in-part of application No. 10/630,290, filed on Jul. 30, 2003, now Pat. No. 6,923,912.

(51) Int. Cl.
*C02F 3/34* (2006.01)
*C02F 3/32* (2006.01)

(52) U.S. Cl. ............ 210/602; 210/632; 210/906; 210/916; 210/917; 210/928; 435/262.5

(58) Field of Classification Search .......... 210/601, 210/632, 906, 916, 917, 928, 602; 435/262, 435/262.5
See application file for complete search history.

(56) References Cited

U.S. PATENT DOCUMENTS

| | | | | |
|---|---|---|---|---|
| 3,406,089 A | * | 10/1968 | Yerkes, Jr. ............... | 162/199 |
| 4,891,320 A | * | 1/1990 | Aust et al. ............... | 435/262 |
| 5,047,332 A | * | 9/1991 | Chahal .................... | 435/42 |
| 5,407,577 A | * | 4/1995 | Nghiem ................... | 210/606 |
| 6,923,912 B1 | * | 8/2005 | Bowling et al. .......... | 210/601 |
| 2002/0106784 A1 | * | 8/2002 | Reverso ................... | 435/267 |
| 2002/0117445 A1 | * | 8/2002 | Whiteman ............... | 210/620 |
| 2002/0151038 A1 | * | 10/2002 | Raghukumar et al. .. | 435/254.1 |
| 2004/0069426 A1 | * | 4/2004 | Siika-Aho et al. ........ | 162/72 |
| 2005/0126990 A1 | * | 6/2005 | Lynch ..................... | 210/602 |
| 2006/0194303 A1 | * | 8/2006 | DeWitt et al. ............ | 435/262 |

FOREIGN PATENT DOCUMENTS

DE 4418355 * 1/1995

OTHER PUBLICATIONS

"Treatment of Olive Oil Mill Wastewater with Fungi", Yesilada et al., Turkish Journal of Biology, vol. 23, pp. 231-240 (1999).*

* cited by examiner

*Primary Examiner*—Fred G. Prince
(74) *Attorney, Agent, or Firm*—Stephen J. Stark; Miller & Miller PLLC

(57) ABSTRACT

A method of treating wastewater sources such as sewer systems or those from pulp and paper mills which contain biomass waste involves adding white rot fungi in the presence of glucose. While glucose may be directly added to the wastewater source, it has been found to be more economical to reduce or substantially remove color from the wastewater by additionally adding brown rot fungi in the presence of cellulose and hemi-cellulose. The addition of bacteria has also been found helpful to improve the reduction in color, biological oxygen demand, as well as chemical oxygen demand in wastewater sludge reduction.

19 Claims, 1 Drawing Sheet

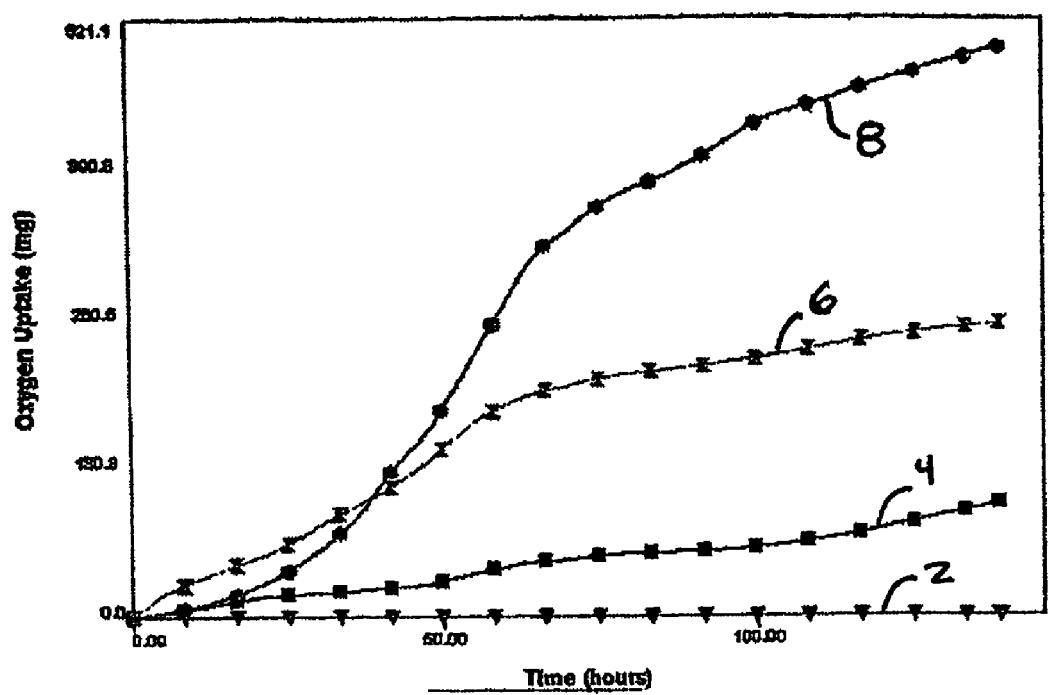
FIGURE

WASTEWATER TREATMENT METHOD UTILIZING WHITE ROT AND BROWN ROT FUNGI

CLAIM OF PRIORITY

This application is a continuation-in-part of U.S. patent application Ser. No. 10/630,290 filed Jul. 30, 2003 now U.S. Pat. No. 6,923,912.

FIELD OF THE INVENTION

The present invention relates to the treatment of wastewater. More particularly, the present invention relates to compound degradation in wastewater, and in particular, to the combined use of brown rot and white rot fungi to reduce color, sludge, phosphorous, odor, ammonia, Biological Oxygen Demand (BOD), and/or Chemical Oxygen Demand (COD) in wastewater, especially in various environments such as sanitary system wastewater, industrial wastewater environments, and the like.

BACKGROUND OF THE INVENTION

White rot fungi are a classification of microorganisms that are able to degrade various compounds. Their ability to degrade lignin is a result of their secretion of highly oxidative ligninonlytic enzymes consisting primarily of phenoloxidases. The phenoloxidase enzymes believed to be of importance in this process are manganese peroxidase, lignin peroxidase, manganese-independent-peroxidase and laccase. These enzymes break the phenylpropane links of lignin creating much smaller compounds. The smaller compounds are called degradation by-products and are easier for bacteria to use as a food source to further degrade into carbon dioxide and water. The peroxidase enzymes may also assist in degrading cellulose and hemi-cellulose, which are structurally more complex than cellulose. It is known that white rot fungi preferentially produce phenloxidases over the other enzymes the fungi normally produce when in the presence of glucose.

Normally aerobic measures are undertaken to reduce colorants and biological oxygen demand (BOD) in wastewater. Aerobic technologies include trickling filter, activated sludge, rotating biological contactors, oxidation ditch, sequencing batch reactor and even controlled wetlands. By introducing air into the wastewater stream, pumps and other mechanical systems are required which consume significant amounts of electricity. The use of electricity obviously increases the costs of treating wastewater.

Accordingly, an anaerobic, or anaerobic-friendly type of technology is believed to be somewhat advantageous to reduce the costs associated with treating the wastewater. Anaerobic technologies currently available are high-rate systems including continuous-flow stirred tank reactors, contact reactors, upflow sludge blankets, anaerobic filters (upflow and downflow), expanded or fluidized bed and two-stage systems that separate the acid-forming and the methane-forming phases of the anaerobic process. In many prior art systems, aerobic and anaerobic processes are combined into a treatment system. Anaerobic treatment may be used for removing organic matter in high concentration streams, and aerobic treatment may be used on lower concentration streams or as a polishing step to further remove residual organic matter and nutrients from wastewater.

There are numerous problems and difficulties with the prior art systems. First, start up and restart problems can occur with the prior art processes. Secondly, biomass separation, sludge settlement, foaming and scum formation can occur. Odors may be associated with the treatment, excessive biomass may be generated, nitrogen and phosphorous may need to be removed, and any number of other problems have been found with the various prior art systems.

Accordingly, a need exists to provide a more effective color removing method for use with wastewater streams.

Another need exists for an anaerobic process for removing colorants and/or otherwise treating wastewater.

Another need exists for reduction of solids, such as biosolids, sludge, etc.

SUMMARY OF THE INVENTION

An object of the present invention is to provide an improved method of treating wastewater.

Another object of the present invention is to provide a method for treating wastewater utilizing white rot and/or brown rot fungi.

Another object of the present invention is to provide a method for enhancing the ability for white rot fungi to selectively produce beneficial enzymes for use in clarifying wastewater streams.

Accordingly, since white rot fungi increases production of phenoloxydases when in the presence of glucose, a need exists to provide a source of glucose to the wastewater stream. Although dissolving sugar of various varieties directly into the wastewater stream has been tried and does work, the cost of the sugar can be relatively expensive. Accordingly, there is a need to provide an inexpensive source of glucose or other simple sugar for a significant population of white rot fungi to preferentially produce the desired enzymes while possibly inhibiting the production of others.

Pulp and paper wastewater environments typically comprise a facultative regime. Normally a sludge layer is located on the bottom of a wastewater lagoon. The sludge consists of unprocessed wood, particularly processed cellulose pulp, cellulose pulp, hemi-cellulose pulp and biomass. Wastewater environments have a supply of biomass, bacteria, and other degradeable components.

When brown rot fungus is introduced into the wastewater stream in the presence of cellulose and/or hemi-cellulose, the brown rot fungus produces a network of roots called hyphae. Along the hyphae network, the fungus secretes digestive acids. The acids dissolve the sludge of cellulose and/or hemi-cellulose material breaking them down into absorbable food. The wood, cellulose and hemi-cellulose components of the sludge are dissolved by these acids and broken down into glucose.

Glucose is a sugar. It is the primary nutrient required by white rot fungus to grow and produce phenoloxidase enzymes. Glucose is also a rich food source for wastewater bacteria populations. Glucose enables these bacteria populations to grow faster and consume more organic materials thereby assisting in further and faster degradation of color and biological oxygen demand (BOD) products. Furthermore, bacteria are also believed to assist in reducing chemical oxygen demand (COD) products. Accordingly, when brown and/or white rot fungus is introduced in the presence of biomass, the BOD, COD, lignin, color phosphorous, odor, sludge quantity, and ammonia, can often be significantly reduced. Furthermore sludge can be digested and filamentous bacteria populations can be controlled.

It has been discovered that some organic materials in wastewater might include lignin and lignin degradation by-products. The bacteria populations which are feeding on the high glucose concentrations metabolize the lignin degradation by-products converting them to carbon dioxide and water thereby further reducing color, BOD and/or COD. Additionally, helpful bacteria may be added in addition to the white rot and brown rot fungus to further expedite and improve the efficiency of the process.

In order to treat wastewater, the applicants have developed a process whereby a combination of white rot and brown rot fungi are introduced into the wastewater. While aerobic conditions could be maintained in the wastewater, it is also possible that anaerobic conditions be established in some embodiments.

The brown rot fungi is introduced to the wastewater source. If there is no sludge bed or low concentrations of wood fiber and cellulose or other biomass in the wastewater, timber, wood pieces or alternative cellulose sources may be floated or otherwise deposited into the water source to provide a food source for the brown rot fungi. At least *trichoderma ressei, trichoderma hazanium, apergillus niger, aspergillus versicolor, chaetomium bolichotricum, chaetomium fusarium* and *chaetomium solani* have been found to be suitable brown rot fungi varieties, however, other varieties may also be utilized as will be explained in further detail hereinafter. Preferably a large population such as $10^{12}$ CFU/ml or greater of the brown rot fungi may be allowed to accumulate in the waste water supply after repetitive seeding steps. Moreover, smaller populations may also be sufficient to provide adequate supplies of glucose depending on the flow of the waste water source.

Some bacteria is also useful in degrading cellulose and other biomass into glucose. Bacteria such as *arthrobacteria* species, *streptomyces* species, *proteus mirabilis, clostridium* species and possibly others can be added along with the brown rot fungi to assist in producing glucose. These bacteria may build up into a large population of at least about $10^{16}$ CFU/ml. Moreover, smaller populations may also be utilized in some embodiments.

Although it is preferable to wait until after the brown rot fungi has established a suitable population, it is not absolutely necessary to wait until a large population of brown rot fungi has established itself before adding the white rot fungi. *Phanerochaete chrysosporium, phanerochaete sorida, pluerotis ostreatus, bjerkandera adusta, pycnoporus cinnabarinus, trametes versicolor*, and *stagonospora gigaspora* are white rot fungi that are known to have a suitable production level of manganese peroxidase, lignin peroxidase and laccase enzymes.

Glucose is an important feature for white rot fungi. The white rot fungi converts glucose to pyruvate. Pyruvate is believed to be an essential "building block" for the white rot fungus (life cycle). As the white rot fungi builds up to a large population such as about $10^{12}$ CFU/ml or larger, the coordinated combination of the microbials has been found effective to significantly reduce color in pulp and paper wastewater streams. In 150 hours in a test environment of a wastewater stream, over an 85% reduction in color was achieved through the combination of these populations while a similar size population of white rot fungi alone reduced the color levels less than 20%. Color, odor, amoniai levels, sludge levels, phosphorous and other levels have been reduced and/or controlled in sanitary system wastewater, and other wastewater environments. Wastewater streams containing azo, vat, sulfer, indigo and reactive dyes are particularly effectively treated using this method to reduce color.

BRIEF DESCRIPTION OF THE DRAWINGS

The particular features and advantages of the invention as well as other objects will become apparent from the following description taken in connection with the accompanying drawing in which:

The FIGURE is a graph showing oxygen uptake in milligrams of various test cultures over time expressed in hours.

DETAILED DESCRIPTION OF THE PREFERRED EMBODIMENTS

In order to treat wastewater whether it be in the form of wastewater streams, lagoons, pools or other wastewater systems, the applicants have devised a method of reducing solids, sludge, biosolids, colorants, ammonia, phosphorous, odor, BOD and/or COD in the wastewater sources. While the method developed by the applicants was developed initially for the paper and pulp industry, it has been successfully tested in other wastewater streams and environments, including treating sanitary system wastewater, a problem encountered by almost every municipality having a sewer system.

Specifically, in order to begin the method, it is possible that all, or at least a part of the aeration systems in the wastewater environment could secured. In some applications, it may be desirable to utilize some or all of the aeration equipment, and the use may depend on the particular application.

The wastewater source, either with or without the aeration sources as secured, may then be seeded or otherwise supplied with a quantity of brown rot fungi. Typically, small populations of brown rot fungi are introduced into the wastewater system and are allowed to grow to large populations. Small populations are defined less than $10^{12}$ CFU/ml while large populations of fungi are defined as $10^{12}$ CFU/ml or greater. A preferred range may be anywhere from $10^6$–$10^{16}$ CFU/ml. Of course, smaller populations could also work if longer time periods are available. In other embodiments the quantity significant enough to constitute a large population may vary either inside or outside the preferred range depending on the particular application and need.

Upon introduction of brown rot fungi to the wastewater, the brown rot fungi decomposes wood fibers, cellulose, hemi-cellulose, and other biomass including human waste. While two particular brown rot fungi, namely, *trichoderma ressei* and *trichoderma hazanium* have been found to be particularly effective, it is also anticipated that *aspergillus niger, aspergillus versicolor, chaetomium bolichotlitum, fusarium, solani*, etc., may also be utilized. The selected brown rot fungi were chosen for their speed of degradation of biomass, such as cellulose and hemi-cellulose into glucose.

The brown rot fungi attacks the biomass either in the sludgebed or otherwise to create glucose. In wastewater sources having no sludgebed or low concentrations of biomass, wood fiber, cellulose, hemi-cellulose, timber, wood pieces or alternative cellulose sources may be floated or otherwise placed in the water source to provide a habitat for the brown rot fungi.

While initial seeding of the brown rot fungi may prove inadequate for growing from a small to a large population, depending upon the size of the wastewater source and its flow, if any, additional inoculations of the brown rot fungi species may be added to the watersource over time. Additionally, multiple strains of brown rot fungi may be combined together and added in a single or in several/multiple additions.

The addition of bacteria such as described above can also be beneficial when added to the water source. These bacteria are believed to functionally work similarly to brown rot fungi in that they are believed to assist in degrading biomass into glucose. These bacteria can assist brown rot fungi in continuous production of glucose.

It is important to remember that glucose is an important food source for the white rot fungi. The white rot fungus converts glucose to pyruvate. Pyruvate is believed to be one of the essential "food building blocks" for the white rot fungus' life cycle. Furthermore, as has been discussed above, the presence of glucose environment accelerates the production of the phenoloxydate enzymes in the white rot fungi. In fact, other enzymatic activity may be reduced in the presence of glucose.

One or more additions of the anaerobic or aerobic bacteria may be added to the water source to shorten the time to achieve a large population of bacteria. A large population of these bacteria is about $10^{16}$ CFU/ml or greater. A preferred population is in the range of $10^8$–$10^{16}$ CFU/ml. Of course, other populations may be useful in some embodiments. Furthermore, while seeding of the bacteria is desirable, of course, in other embodiments larger populations may be added depending on their availability and time constraints involved.

In one preferred embodiment of the method, the brown rot fungi and bacteria are preconditioned in a water supply prior to the addition of any white rot fungi. Of course, in other embodiments the precondition step may be omitted depending upon the specific objectives and conditions of the water source. Furthermore, upon the addition of white rot it may take several months, such as one or two months, and even repeated seeding to grow the white rot fungi to an acceptable population level to produce a desired reduction in color, BOD and/or COD, especially in a flow of wastewater.

The white rot fungi is preferably added to the water source in the presence of glucose so that the phenyloxidase enzymes are preferentially produced. In testing environments, *phanerochaete chrysosporium, phanerochaete sorida* and *pluerotis ostreatus* are utilized together and seeded at intervals. Of course, one or more of these separate fungi strains can be utilized depending upon the particular objectives. Additionally, other white rot fungi are capable of degrading biomass such as lignin or human waste products. Some of these additional white rot fungi strains include *bjerkandera adusta, Pycnoporus cinnabarinus, trametes versicolor, stagonospora gigaspora*, etc. The particular strains of white rot fungi have been selected due to their anticipated levels of production of manganese peroxidase, lignin peroxidase and laccase enzymes. Of course, other white rot fungi may produce these three enzymes in suitable quantities to perform the desired color clarification and/or reduction of BOD, COD, amonia, phosphorous, sludge, and filamentous bacteria.

Furthermore, while seeding is the preferred technique through several inoculations or additions of white rot fungi to the water source, it may be desirable to achieve a large population through direct addition. A large population is $10^{12}$ CFU/ml or greater, but a preferred range is $10^7$–$10^{16}$ CFU/ml. Of course, small populations may also be useful and perform satisfactorily depending upon the objectives of the treatment desired. In non-flow through water sources, small populations of all the organisms are believed to work, it just may take substantially more time.

Initially, the applicants tested the theory that white rot fungi would preferentially produce the phenoloxidaxes in the presence of glucose by seeding white rot fungi into a wastewater lagoon and dumping about two tons of sugar in the lagoon daily. As one can examine the cost of this test was relatively significant although promising results were observed by the relatively rapid growing of the population of white rot fungi. The color reduction experienced led to the investigation for a cheaper source of sugar.

Another series of tests were conducted using a respirometer, an instrument measuring biological reactions by measuring an exchange of gas. The tests were performed to assist the applicants in determining whether pulp laced wastewater stream could be treated as proposed. The figure shows oxygen uptake in milligrams relative to hours in a wastewater stream. The lower line 2 represents an untreated wastewater supply. There is no change in oxygen uptake and no increase in oxygen uptake when no fungi were present. The average color measurement for this control test was 1504 Pt-Co units. The next test line 4 represents the addition of white rot fungi in the flow of mixture of *P. chrysosporium, P. sorida,* and *Pluerotis Ostreatus*. No bacteria is added to this solution. This resulted in a modest color reduction of 17.28% and a slight increase in oxygen uptake over a 150 hour period. The average color measurement was 1244 Pt-Co units.

As the FIGURE represents, the next test line 6 was conducted with both brown and white rot fungi with no bacteria added. As is reflected in the graph, the oxygen uptake substantially tripled compared to the use of white rot alone. A 79.25% reduction in color was experienced over a 150 hour test. The average color measurement was 312 Pt-Co units. The specific strains of fungi added where *P. chrysosporium, P. sorida, Pluerotis Ostreatus, T. hazanium* and *T. resseii*. While these results were very good and a dramatic improvement over the prior art, the addition of the bacteria described above to the mixture results in even further color reduction of 87.76%. The average color measurement was 184 Pt-Co units. Test line 8 was conducted while both brown rot and white rot fungi and bacteria show that in the first 30 or 40 hours the presence of the bacteria reduced the oxygen uptake, because the oxygen uptake increased more exponentially as opposed to linearly as was done with the use of white and brown rot fungi alone. Accordingly, by the 150 hour point, the oxygen uptake was more than double that of when using only the white rot and brown rot combinations together.

While the color reduction percentages are extremely important and significant, the increase in oxygen uptake is similarly significant as the higher the oxygen uptake, the higher the degree of biodegradation and the further reduction of BOD and COD are believed to be occurring during this process.

Similar tests have also been conducted with wastewater having human waste products therein. In one application, wastewater sludge was reduced from three million gallons to 1.8 million gallons in a relatively short period of time. This resulted in lower landfill costs as well as lower hauling costs to dispose of the sludge.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

What is claimed is:

1. A method of treating wastewater comprising:
   a) providing a source containing a biomass in at least one of a paper, pulp, and a human waste water source;
   b) adding a supply of simple sugar to the wastewater source and adding at least one of the bacteria selected 2 from the group consisting of *clostridium cellulolyticum, clostridium celluloverans, arthrobacteria* species, *streptomyces* species and *proteus mirabilis* to the wastewater source;
   c) adding a supply of white rot fungus into the wastewater source in the presence of the simple sugar wherein the simple sugar accelerates the production of phenoloxidases from the white rot fungus which break down at least a portion of the biomass; and
   d) as a result of the breaking down of the biomass, thereby decreasing at least one of a phosphorous amount, an amount of color in the wastewater, an odor of the wastewater, an ammonia amount in the wastewater, an amount of volume by weight solids suspended in the wastewater, and an amount of sludge that can not be effectively separated from the wastewater sludge.

2. The method of claim 1 wherein the wastewater source provided is from a waste water source containing one of a human waste and dyes.

3. The method of claim 1 wherein the white rot fungus added is at least one of *phanerochaete chrysosporium, phanerochaete sorida, pluerotis ostreatus, bjerkandera adusta, pycnoporus cinnabariunus, trametes versicolor*, and *stagonospora gigaspora*.

4. The method of claim 3 wherein the white rot fungus is allowed to grow to a population in the range of about $10^6$–$10^{16}$ CFU/ml in the wastewater source.

5. The method of claim 1 wherein the white rot fungus is added through seeding one of a single step, in several steps over time, and continuous.

6. The method of claim 1 wherein breaking down of the biomass further controls a level of filamentous bacteria in the wastewater source.

7. A method of treating wastewater comprising:
   a) providing a source containing a biomass in at least one of a paper, pulp, and a human waste water source;
   b) adding a supply of simple sugar to the wastewater source by converting at least some of the biomass to glucose by a brown rot fungus;
   c) adding a supply of white rot fungus into the wastewater source in the presence of the simple sugar wherein the simple sugar accelerates the production of phenoloxidases from the white rot fungus which break down at least a portion of the biomass; and
   d) as a result of the breaking down of the biomass, thereby decreasing at least one of a phosphorous amount, an amount of color in the wastewater, an odor of the wastewater, an ammonia amount in the wastewater, an amount of volume by weight solids suspended in the wastewater, and an amount of sludge that can not be effectively separated from the wastewater sludge.

8. The method of claim 7 further comprising the step of adding the brown rot fungus to the wastewater source wherein at least one of prior to the step of adding the white rot fungus and contemporaneous with the step of adding white rot fungus.

9. The method of claim 8 wherein the brown rot fungus added is at least one of *trichoderma ressei, trichoderma hazanium, aspergillus versicolor, chaetomium bolichotricum, fusarium*, and *solani*.

10. The method of claim 9 wherein the brown rot fungus is allowed to grow to a population in the range of about $10^6$—about $10^{16}$ CFU/ml.

11. A method of treating wastewater comprising:
   a) providing a wastewater source having biomass comprising at least one of human waste, dye and other organic matter in contact therewith;
   b) adding brown rot fungi into the wastewater source in the presence of the at least one of human waste, dye and other organic matter;
   c) allowing the brown rot fungi to convert at least some of the at least one of human waste, dye and other organic matter into glucose; and
   d) as a result of the breaking down of the biomass, thereby decreasing at least one of an odor of the wastewater, an ammonia amount in the wastewater, an amount of volume by weight solids suspended in the wastewater, and an amount of sludge that can not be effectively separated from the wastewater sludge.

12. The method of claim 11 further comprising the steps of:
   adding white rot fungi into the wastewater source; and
   allowing the white rot fungi to produce phenoloxidases in the presence of glucose to degrade at least one of color, odor, ammonia quantity, phosphorous quantity, an amount of volume by weight solids suspended in the wastewater, and an amount of sludge that can not be effectively separated from the wastewater sludge.

13. The method of claim 12 wherein the brown rot fungus is added through seeding one of a single step, in several steps over time, and continuous.

14. The method of claim 12 wherein the white rot fungi added is at least one taken from the group of *phanerochaete chrysosporium, phanerochaete sorida, pluerotis ostreatus, bjerkandera adusta, pycnorporus cinnabariunus, trametes versicolor*, and *stagonospora gigaspora*.

15. The method of claim 11 further comprising the step of adding at least one bacteria selected from the group of *clostridium cellulolyticum, clostridium celluloverans,* arthrobactria species, *streptomyces* species and *proteus mirabilis*.

16. The method of claim 11 wherein the brown rot fungi added is at least one taken from the group of *trichoderma ressei, trichoderma hazanium, aspergillus versicolor* and *chaetomium dolichotricum, fusarium* and *solani*.

17. A method of treating wastewater comprising:
   a) providing a wastewater source having biomass
   b) adding brown rot fungi into the wastewater source in the presence of the biomass:
   c) allowing the brown rot fungi to convert at least some of the glucose;
   d) adding white rot fungi into the wastewater source; and
   e) allowing the white rot fungi to produce phenoloxidases in the presence of glucose to assist in treating the wastewater source to perform at least one of:
      i) color reduction;
      ii) sludge reduction;
      iii) sludge digestion;
      iv) phosphorous reduction;
      v) odor reduction;
      vi) control filamentous bacteria;
      vii) ammonia reduction;
      viii) reducing BOD;
      ix) reducing COD; and
      x) improving separation of water from sludge.

18. The method of claim 17 wherein biomass sludge further comprises one of human waste, and the phenoloxidases from the white rot fungi break down at least a portion of the human waste, dye and the phenoxidas from the white rot fungi break down at least a portion of the dye and other organic matter, and the phenoxidas from the white rot fungi break down at least a portion of the other organic matter.

19. The method of claim 17 wherein comprising the step of adding at least one of an *arthrobacter* species, a *streptomyces* species, *proteus mirabilis, clostridium cellololyticum,* and *clostridium celluloverans*.

* * * * *